(12) United States Patent
Sventek et al.

(10) Patent No.: US 8,727,139 B1
(45) Date of Patent: May 20, 2014

(54) KITCHEN UTENSIL AND METHOD FOR TEMPORARILY HOLDING LID OF COOKING VESSEL

(76) Inventors: Jeanne Sventek, Woodbury, MN (US);
Bruce Sventek, Woodbury, MN (US);
Tanner Sventek, Woodbury, MN (US)

( * ) Notice: Subject to any disclaimer, the term of this patent is extended or adjusted under 35 U.S.C. 154(b) by 30 days.

(21) Appl. No.: 13/358,663

(22) Filed: Jan. 26, 2012

Related U.S. Application Data

(60) Provisional application No. 61/436,231, filed on Jan. 26, 2011.

(51) Int. Cl.
*A47G 19/08* (2006.01)
*A47B 91/00* (2006.01)
*F16M 11/00* (2006.01)
*A47G 29/00* (2006.01)

(52) U.S. Cl.
USPC ............. 211/41.6; 211/41.11; 248/346.01; 248/176.1; 248/346.03; 220/744

(58) Field of Classification Search
USPC ............. 211/41.11, 41.1, 41.5, 41.6, 41.7, 211/85.15; 248/150, 463, 464, 346.03, 248/346.3, 346.5, 176.1, 346.01; 220/744, 220/630, 628, 150, 460, 463, 464
See application file for complete search history.

(56) References Cited

U.S. PATENT DOCUMENTS

| | | | | | |
|---|---|---|---|---|---|
| 253,461 | A | * | 2/1882 | Wold | 211/41.6 |
| 910,057 | A | * | 1/1909 | Greener | 248/175 |
| 989,699 | A | * | 4/1911 | Deem | 248/463 |
| 1,349,084 | A | * | 8/1920 | Moore | 211/41.11 |
| 1,528,744 | A | * | 3/1925 | Dix | 211/41.11 |
| 1,714,629 | A | * | 5/1929 | Rodin | 211/195 |
| 2,039,927 | A | * | 5/1936 | Poglein | 211/13.1 |
| 2,250,808 | A | * | 7/1941 | Lynch | 248/464 |
| 2,519,711 | A | * | 8/1950 | Sprechmann | 211/41.7 |
| 2,528,388 | A | * | 10/1950 | Richards | 211/41.7 |
| 2,629,498 | A | * | 2/1953 | Marasigan | 211/41.7 |
| 2,677,518 | A | * | 5/1954 | Happy et al. | 248/125.7 |
| 2,958,424 | A | * | 11/1960 | Bigatti | 211/41.5 |
| 3,024,022 | A | * | 3/1962 | Goyette | 482/17 |
| 3,282,437 | A | * | 11/1966 | Hansen | 211/41.7 |
| 4,453,470 | A | * | 6/1984 | Capella | 108/26 |
| D275,245 | S | * | 8/1984 | Pack | D6/462 |
| 4,600,108 | A | * | 7/1986 | Scott et al. | 211/49.1 |
| 4,623,111 | A | * | 11/1986 | Prader | 248/97 |
| 4,776,469 | A | * | 10/1988 | Geleziunas | 211/41.11 |
| 4,790,503 | A | * | 12/1988 | Pohler | 248/176.2 |
| D301,105 | S | * | 5/1989 | Maxwell | D7/637 |
| 4,927,104 | A | * | 5/1990 | Miller | 248/97 |
| 5,018,691 | A | * | 5/1991 | King | 248/99 |
| D320,332 | S | * | 10/1991 | Fetty | D7/638 |
| 5,127,616 | A | * | 7/1992 | Carney | 248/176.2 |
| 5,396,993 | A | * | 3/1995 | Spitler | 211/41.2 |

(Continued)

*Primary Examiner* — Joshua J Michener
*Assistant Examiner* — Devin Barnett
(74) *Attorney, Agent, or Firm* — Sherrill Law Offices, PLLC

(57) ABSTRACT

An aftermarket kitchen utensil and a method of using the utensil to support a cover of a cooking vessel such that the cover does not obstruct the service of food from the cooking vessel while drippings from the inner surface of the supported cover are guided into the cooking vessel. The utensil includes a body, a first support assembly operable and effective for supporting the body in a vertically upright position during use, and a second support assembly operable and effective for supporting the cover of a cooking vessel in a desired orientation relative to the cooking vessel.

5 Claims, 8 Drawing Sheets

(56) References Cited

U.S. PATENT DOCUMENTS

| | | | |
|---|---|---|---|
| 5,683,010 A * | 11/1997 | Boyajian, Jr. | 220/744 |
| D398,483 S * | 9/1998 | Stocco | D7/601 |
| 5,852,250 A * | 12/1998 | Cha | 84/327 |
| D405,652 S * | 2/1999 | Tsoi | D7/624.1 |
| 6,003,688 A * | 12/1999 | Steidle | 211/41.11 |
| 6,012,593 A * | 1/2000 | Knittel et al. | 211/41.11 |
| 6,382,573 B1 * | 5/2002 | Cepeda | 248/97 |
| D476,847 S * | 7/2003 | Kingsley et al. | D7/388 |
| 7,025,312 B1 * | 4/2006 | Dare | 248/176.1 |
| 7,243,884 B2 * | 7/2007 | Lawson et al. | 248/95 |
| 7,284,733 B2 * | 10/2007 | Parenteau | 248/213.2 |
| 7,717,377 B1 * | 5/2010 | Corrado | 248/150 |
| 8,322,665 B2 * | 12/2012 | Palik | 248/166 |
| 2004/0007545 A1 * | 1/2004 | Morgan | 211/41.11 |
| 2006/0011787 A1 * | 1/2006 | Law | 248/121 |
| 2007/0199908 A1 * | 8/2007 | Kasden et al. | 211/41.5 |
| 2009/0173703 A1 * | 7/2009 | Einbinder et al. | 211/41.11 |
| 2009/0230134 A1 * | 9/2009 | Romandy | 220/573.1 |
| 2009/0272749 A1 * | 11/2009 | Romandy et al. | 220/573.1 |
| 2010/0193523 A1 * | 8/2010 | Beisheim | 220/379 |
| 2011/0260023 A1 * | 10/2011 | Braun | 248/220.21 |
| 2012/0235003 A1 * | 9/2012 | Turbes | 248/309.1 |
| 2012/0318936 A1 * | 12/2012 | Lutz et al. | 248/121 |

* cited by examiner

KITCHEN UTENSIL AND METHOD FOR TEMPORARILY HOLDING LID OF COOKING VESSEL

CROSS-REFERENCE TO RELATED APPLICATIONS

This application is based on Provisional Patent Application No. 61/436,231 filed on Jan. 26, 2011.

FIELD OF THE INVENTION

The present invention generally relates to kitchen utensils, and more particularly to kitchen utensils adapted for holding the cover or lid of a pot, pan, slow cooker, etc. while accessing the contents thereof.

BACKGROUND OF THE INVENTION

It is a widespread and common practice to provide party guests with an array of hot and cold food served buffet style. Hot food is typically served from a covered slow cooker or a covered thermally wrapped pot to keep the food warm over the course of the event. This means that guests must remove the cover in order to obtain a serving of the food retained therein. As most of us have experienced, this poses a problem as each guest desiring a serving of hot food finds themselves holding a plate in one hand and a hot cover in the other hand, leaving them with no way to dish up the now accessible food. Unless another guest is immediately available to help, the guest is forced to temporarily abandon the cover in order to provide a free hand for serving the food. The problems associated with this practice are legion, ranging from the dripping of condensate from the abandoned cover onto the surface supporting the abandoned cover and the smearing of food from the abandoned cover onto on the supporting surface, to burning of fingers and dropping of the cover into the food or onto the floor.

Covered cooking vessels and the issue of dealing with the cover during cooking and serving have been around for centuries. For example, U.S. Pat. No. 1,349,084 issued in 1920 discloses a holder for temporarily restraining a kettle-cover between two horizontally spaced loops of wire extending vertically from a common base. While effective for holding the cover, the device is bulky and does not prevent dripping of condensate or food onto the supporting surface.

Numerous other attempts have been made to solve the aforementioned problems. Exemplary efforts are disclosed in U.S. Pat. Nos. 4,790,503, 5,127,616, 5,396,993, 5,683,010 and 7,284,733, U.S. Design Pat. D301,105 and D320,332, and U.S. Patent Application Publications 20090230134, and 20100193523.

While generally effective for providing a place to temporarily stow the cover of a heated cooking vessel, a continued need exists for an inexpensive and universally applicable device capable of temporarily stowing a wide range of covers used with a wide range of cooking vessels such that the stowed cover does not substantially obstruct access to food within the cooking vessel yet ensures that any food and/or condensate on the cover drips back into the cooking vessel.

SUMMARY OF THE INVENTION

A first aspect of the present invention is an aftermarket kitchen utensil operable for supporting a cover of a cooking vessel such that the cover does not obstruct the service of food from the cooking vessel while drippings from the inner surface of the supported cover are guided into the cooking vessel. The utensil includes a body, a first support assembly operable for supporting the body on a planar horizontal support surface in a longitudinally upright position proximate a cooking vessel, and a second support assembly operable for supporting the cover of a cooking vessel in a desired orientation. The body has longitudinally spaced first and second ends, laterally spaced first and second sides, and a transverse thickness. The first support assembly is attached to the body proximate the first end of the body. The second support assembly is attached to the body proximate the second end of the body. The desired orientation of a cover supported by the second support assembly includes (i) the entire cover higher than the open top of the retention chamber of the cooking vessel associated with the cover, (ii) the inner surface of the cover facing upward, (iii) the plane defined by the rim of the cover defining an angle of less than 60° relative to vertical, and (iv) the cover extending over a minor portion of the area defined by the open top of the retention chamber.

A second aspect of the present invention is a method of supporting a cover of a cooking vessel such that service of food from the cooking vessel is unobstructed by a supported cover while drippings from an inner surface of the supported cover are guided into the cooking vessel. The method includes the steps of (1) obtaining a cooking vessel having a cover with a rim and food within a retention chamber of the cooking vessel, (2) obtaining a kitchen utensil in accordance with the first aspect of the present invention, (3) resting the cooking vessel upon a horizontal surface, (4) resting the kitchen utensil upon the horizontal surface proximate the cooking vessel with the longitudinal axis of the body extending vertically upward from the horizontal surface, (5) removing the cover from the cooking vessel, and (6) supporting the removed cover with the second support assembly on the kitchen utensil, whereby (i) the entire removed and supported cover is vertically higher than the retention chamber of the cooking vessel, (ii) the cover is inverted, (iii) a plane defined by the rim of the removed and supported cover that is inclined away from the cooking vessel, and (iv) a lowermost portion of the rim of the inverted cover is positioned over the retention chamber of the cooking vessel.

DETAILED DESCRIPTION OF THE INVENTION

Nomenclature

Figure 1:
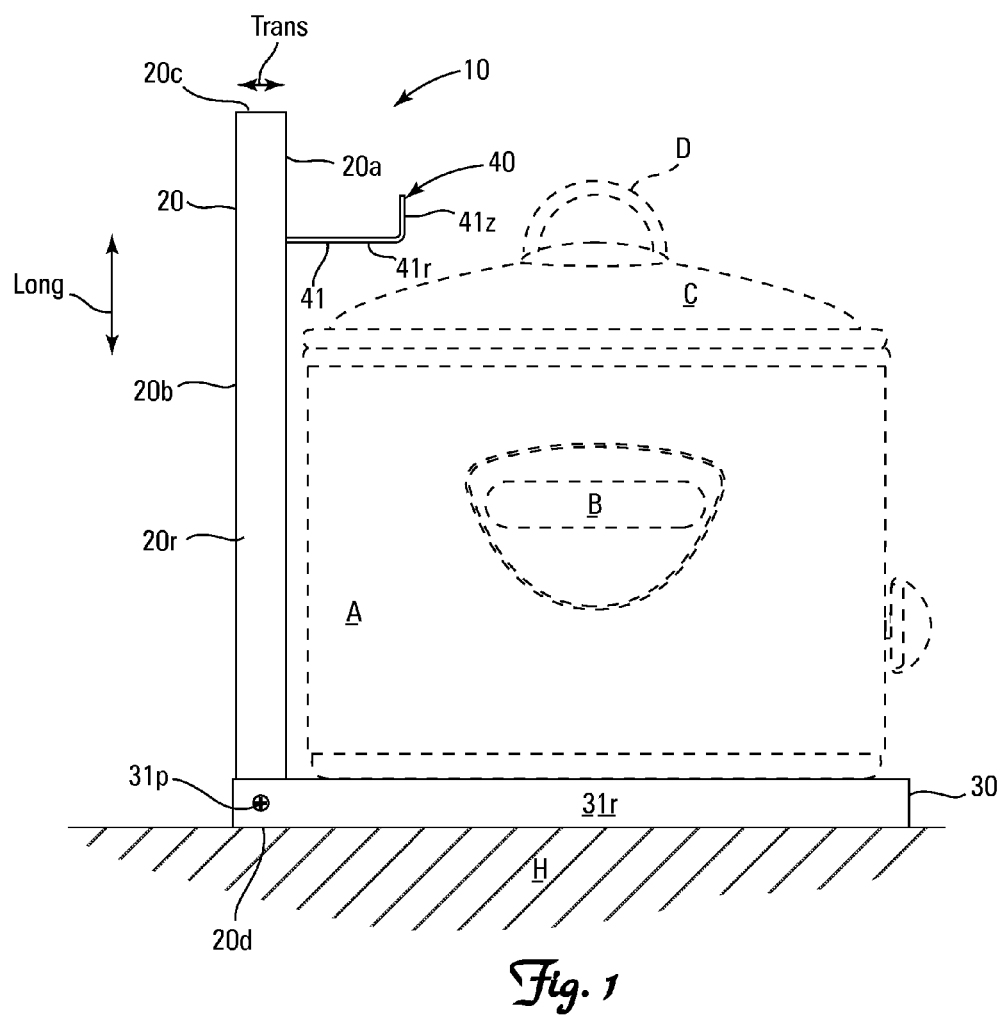
FIG. 1 is a side view of one embodiment of the invention employed in connection with a slow cooker.
Figure 2:
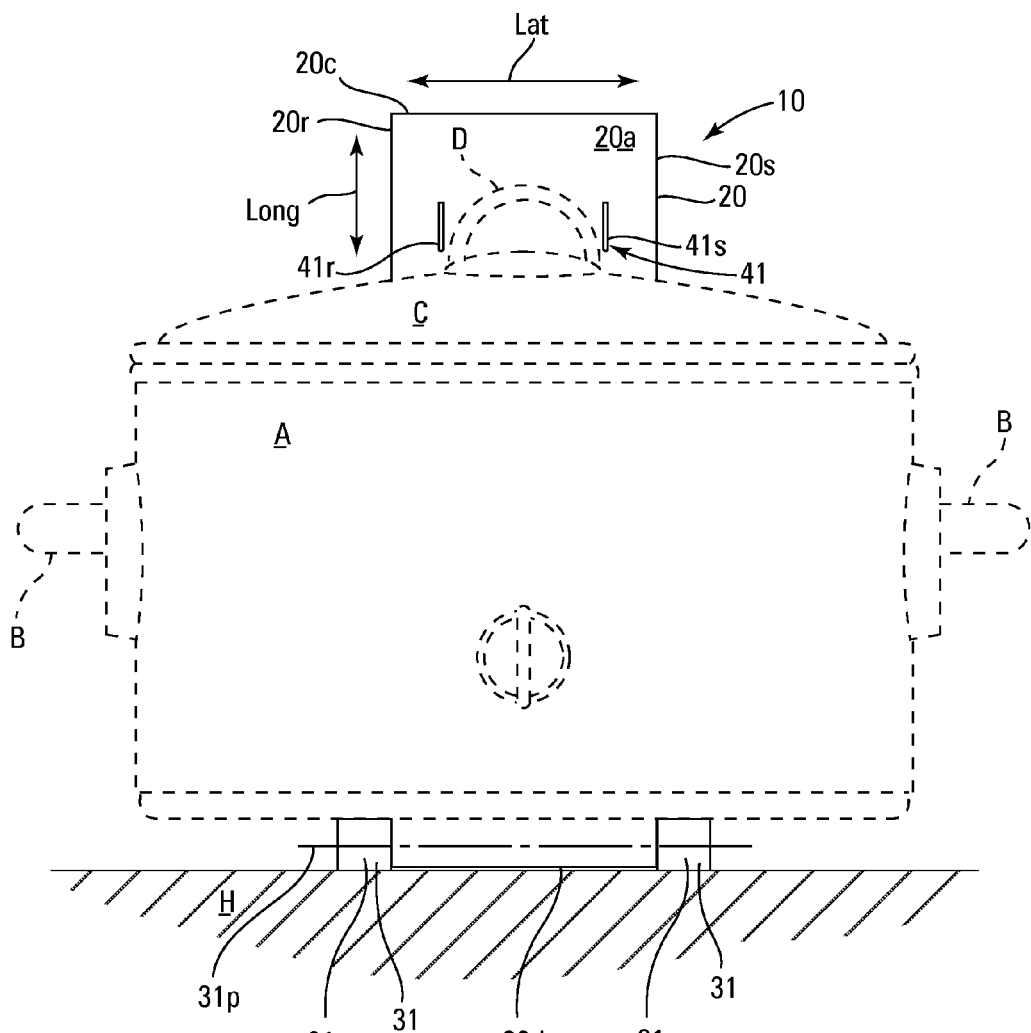
FIG. 2 is a front view of the invention depicted in FIG. 1.
Figure 3:
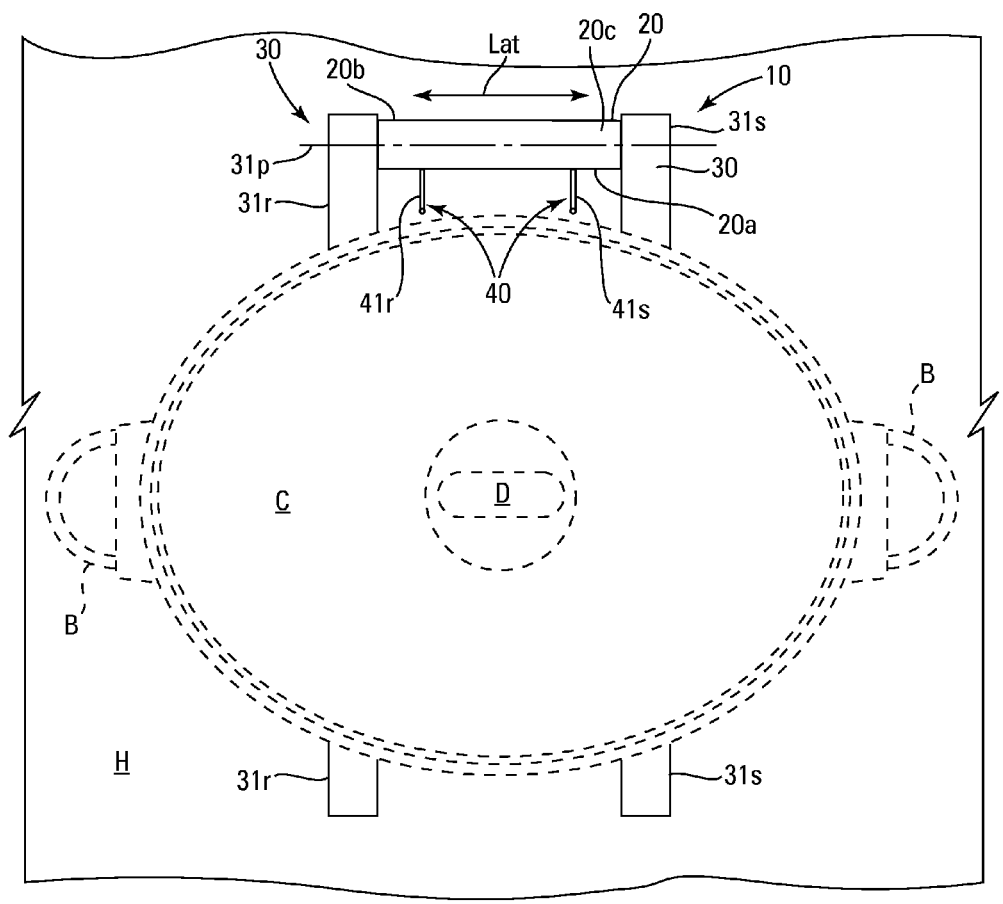
FIG. 3 is a top view of the invention depicted in FIG. 1.
Figure 4:
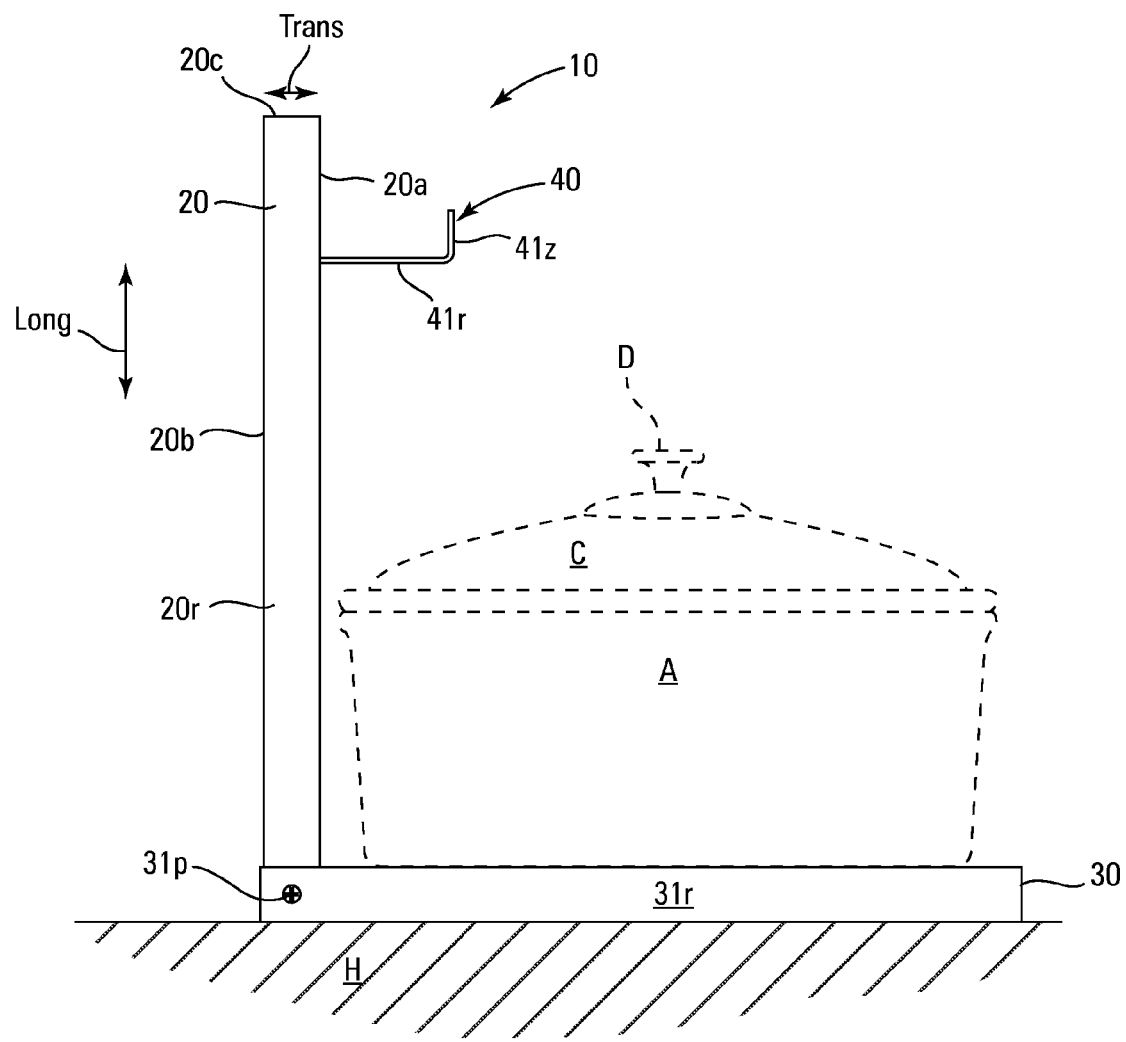
FIG. 4 is a side view of the invention depicted in FIG. 1 employed in connection with a casserole dish.

10 Utensil
20 Body
20a Front Surface of Body
20b Rear Surface of Body 20c Upper End of Body
20d Lower End of Body
20r Right Side Edge of Body
20s Left Side Edge of Body
30 Foundation Support Assembly
31 Legs
31r Right Leg
31s Left Leg
31p Pivot Axis of Legs
32 Catch Mechanism
$32_{Post}$ Longitudinal Post
$32_{Offset}$ Offset Member
$32_{Fast}$ Fastener
33 Weighted Footings
40 Cover Support Assembly
41 Transversely Projecting Members
41r Right Support Member
41s Left Support Member
41z Stop
42 Catch n Offset Combination
42a Center Catch
42b Offset Member
Long Longitudinal Direction of Body (Length)
Lat Lateral Direction of Body (Width)
Trans Transverse Direction of Body (Depth or Thickness)
A Cooking Vessel
$A_1$ Retention Chamber of Cooking Vessel
B Handle on Cooking Vessel
C Cover of Cooking Vessel
$C_1$ Inner Surface of Cover
$C_2$ Rim of Cover
D Handle on Cover
H Horizontal Surface

DEFINITIONS

As utilized herein, including the claims, the term "minor" shall mean less that 25%.

DESCRIPTION

Construction

The invention is an aftermarket kitchen utensil 10 for supporting a cover C of a cooking vessel A such that the cover C does not obstruct the service of food (not shown) from the cooking vessel A while drippings (not shown) from the inner surface $C_2$ of the supported cover C are guided into the cooking vessel A. Referring generally to the illustrative drawings FIGS. 1-8, the utensil 10 includes a body 20, a first support assembly 30 operable and effective for supporting the body 20 in a vertically upright position during use, and a second support assembly 40 operable and effective for supporting the cover C of a cooking vessel A in a desired orientation relative to the cooking vessel A. The utensil 10 may be constructed as a single unitary piece or assembled from separately formed components.

The utensil 10 can be constructed from substantially any material capable of providing the necessary structural integrity. Suitable materials of constructions include specifically, but not exclusively, cellulosic materials such as paperboard and cardboard, engineered wood products such as laminated and unlaminated fiberboard and plywood, wood, plastics such as polyethylene, polypropylene, polyethylene terephthalate, nylon polycarbonates and phenolic resins, wood-plastic composites, metals such as aluminum, copper, brass and steel, glass, ceramics, combinations thereof, and the like.

The materials of choice are thermally insulating and capable of withstanding temperatures up to about 300° F. preferably 400° F., such as wood and plastics.

The body 20 has a front 20a, a rear 20b, an upper end 20c, a lower end 20d, a right side 20r and a left side 20s. The body 20 may be solid, a hollow body or as a framework with or without two-dimensional or three-dimensional surface ornamentation. The body 10 preferably has a maximum longitudinal Long length of about 8 to about 16 inches, a maximum lateral Lat width of about 2 to about 6 inches, and a maximum transverse Trans thickness of about 0.1 to about 2 inches. A length of less than about 8 inches renders the utensil 10 incapable of supporting a cover C an appropriate distance above a horizontal surface H while a length of greater than about 16 inches increases the bulk and cost of the utensil 10 without providing a concomitant benefit. A width of less than about 2 inches renders a cover C supported by the utensil 10 laterally unstable, while a width of greater than about 6 inches increases the bulk and cost of the utensil 10 without providing a concomitant benefit. Finally, a thickness of less than about 0.1 inch does not provide the necessary stability in the transverse Trans direction, while a thickness of greater than about 2 inches increases the bulk and cost of the utensil 10 without providing a concomitant benefit.

The first support assembly 30 is attached proximate the lower end 20d of the body 20. The first support assembly 30 is configured and arranged for supporting the body 20, and any cover C supported by the utensil 10, in a vertically upright position proximate a cooking vessel A during use.

One embodiment of a first support assembly 30 is depicted in FIGS. 1-4. This embodiment of the first support assembly 30 includes a pair of legs 31 (right leg 31r and left leg 31s) extending transversely from the body 20. The legs 31 are preferably pivotally attached to the body 20 for pivoting about a pivot axis 31p as between a storage position in which the legs 31 are in planar alignment with the body 20, and a use position in which the legs 31 extend transversely from the body 20. The legs 31 can but need not lock or snap into the storage and/or use position. However, when the legs 31 do not snap or lock into the use position, the lower end 20d of the body 20 should present a relatively flat surface that is in relative planar alignment with the underside (unnumbered) of the legs 31 so that the lower end 20d of the body 20 will contact and rest upon the horizontal surface H upon which the utensil 10 is placed—thereby restraining the body 20 from pivoting about the pivot axis 31p when the utensil 10 is in the upright use position.

The legs 31 preferably have a length of between about 8 to 16 inches, and most preferably have a length that matches the longitudinal Long length of the body 20. Legs 31 having a length of less than about 8 inches do not provide the desired transverse Trans stability during use while legs 31 having a length of greater than about 16 inches increases the bulk and cost of the utensil 10 without providing a concomitant benefit.

Figure 5:
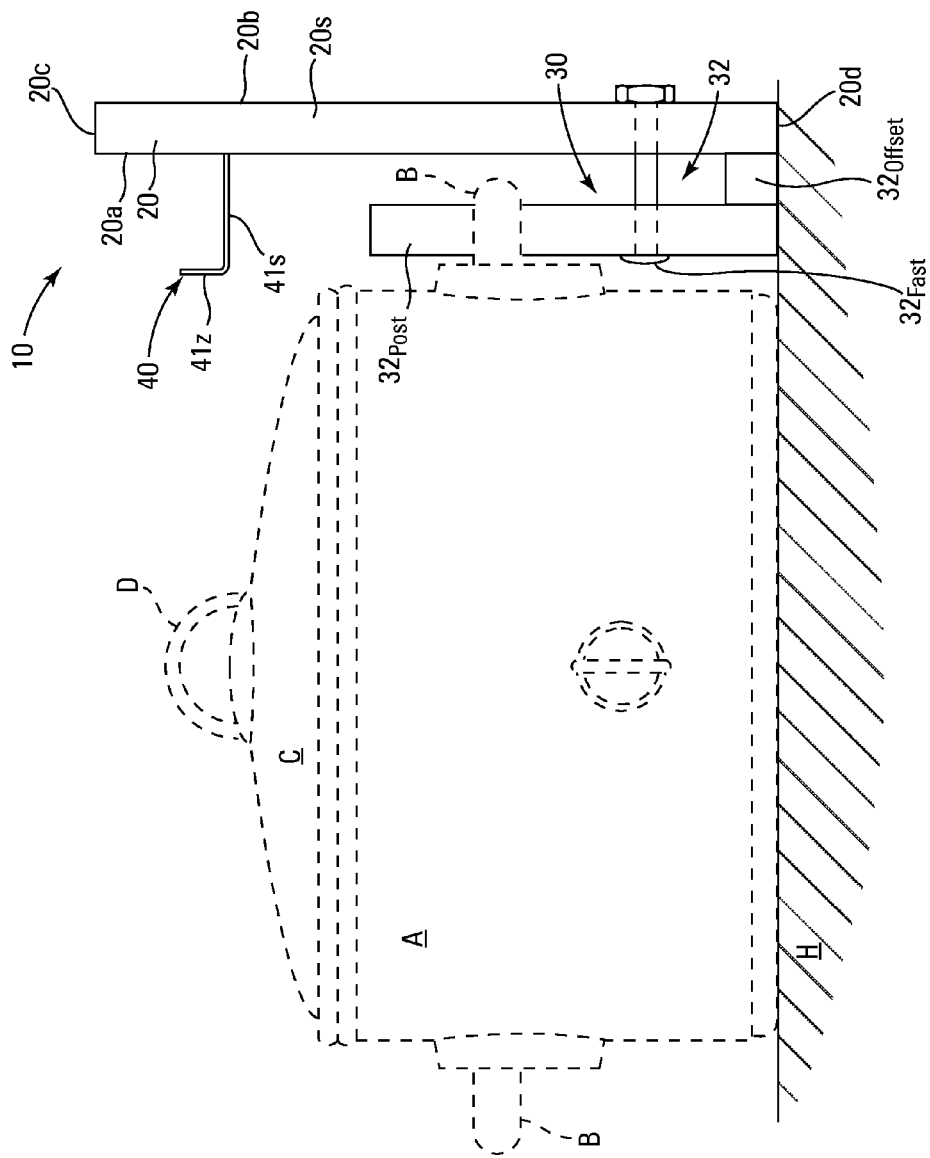
FIG. 5 is a side view of a second embodiment of the invention employed in connection with a slow cooker.

Another embodiment of a first support assembly 30 is depicted in FIG. 5. This embodiment of the first support assembly 30 comprises a catch mechanism 32 for engaging a loop handle $C_2$ on a cooking vessel C. One suitable catch mechanism 32, depicted in FIG. 5, includes a longitudinal post $32_{Post}$ projecting upward from the lower end 20d of the body 20 and transversely offset from the body 20 by an offset member $32_{Offset}$. The longitudinal post $32_{Post}$ is sized, shaped, configured and arranged for insertion into a loop handle $C_2$. A fastener $32_{Fast}$ may be provided for stably securing the post $32_{Post}$ to the body 20 once the post $32_{Post}$ has been inserted into and engages the loop handle $C_2$.

Figure 6:
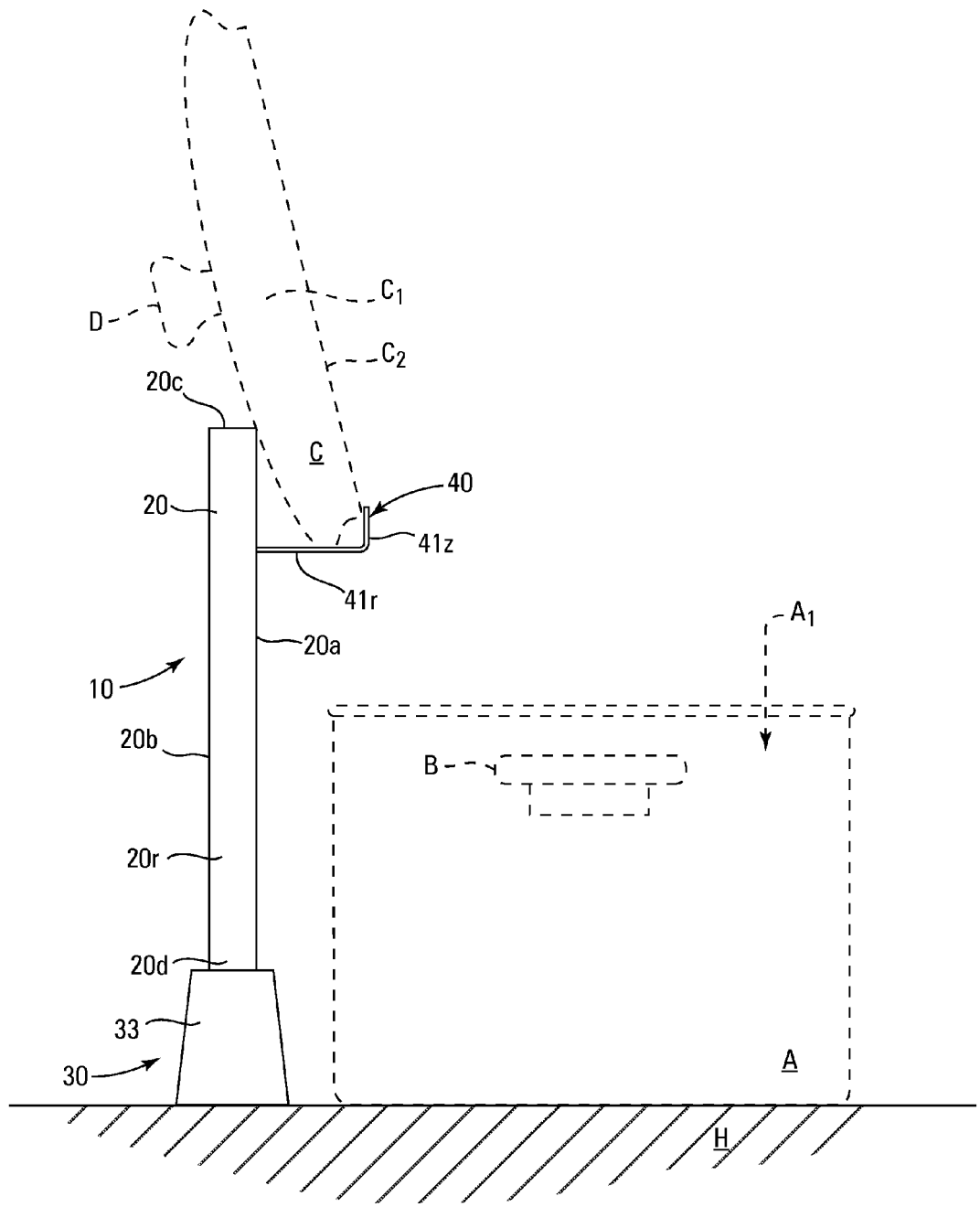
FIG. 6 is a side view of a third embodiment of the invention employed in connection with a cooking pot.
Figure 7:
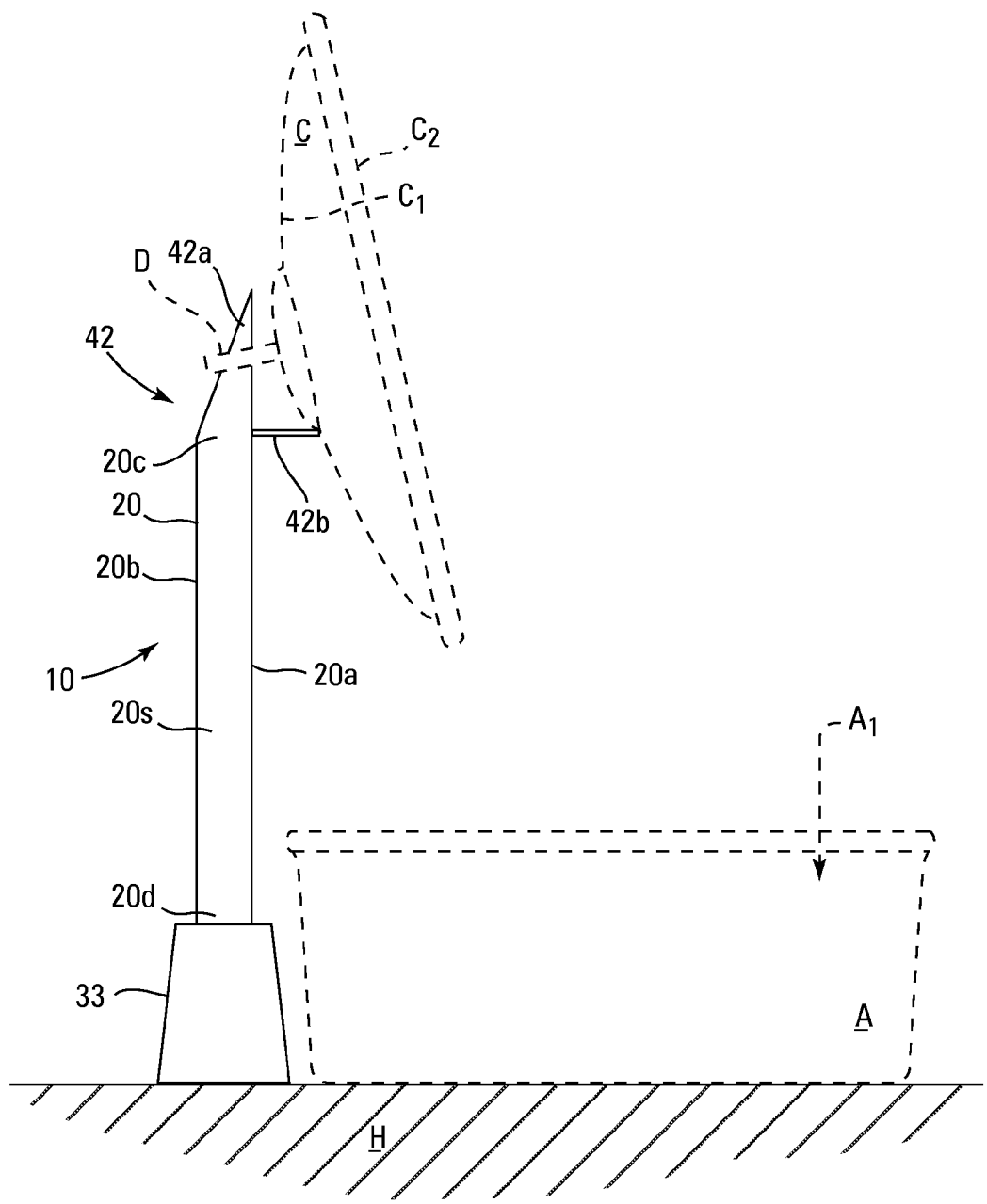
FIG. 7 is a side view of a fourth embodiment of the invention employed in connection with a casserole dish.
Figure 8:
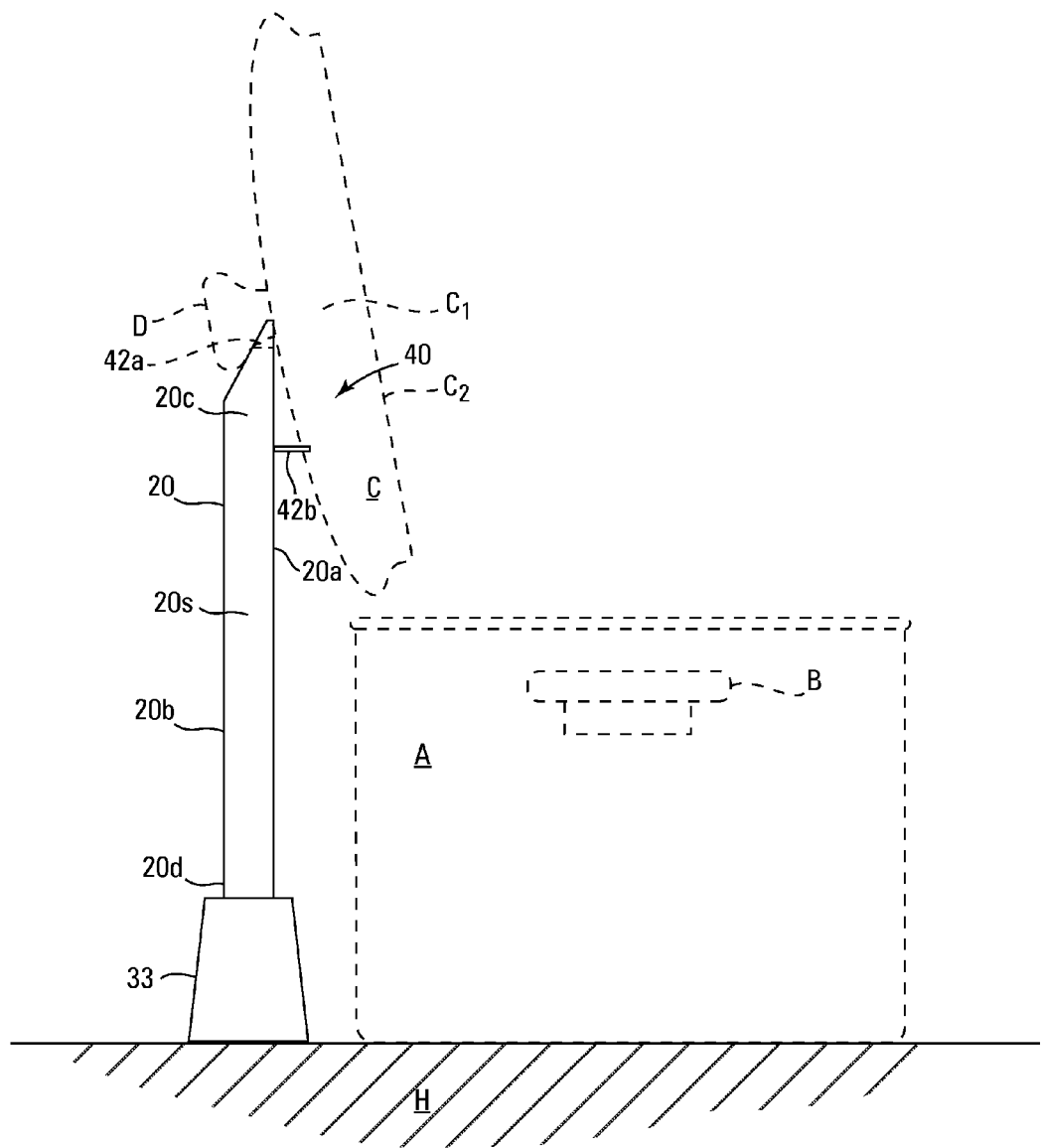
FIG. 8 is a side view of a fifth embodiment of the invention employed in connection with a cooking pot.

Yet another embodiment of a first support assembly 30 is depicted in FIGS. 6-8. This embodiment of the first support assembly 30 comprises a weighted footing 33 attached at the lower end 20d of the body 20. Generally, a weighted footing 33 weighing between about 2 to 5 lbs and presenting a footprint of at least about 3 in$^2$, preferably at least about 4 in$^2$ provides sufficient stability during normal use of the utensil 10.

The second support assembly 40 is attached proximate the upper end 20c of the body 20. The second support assembly 40 is configured and arranged for supporting the cover C of a cooking vessel A in a desired orientation relative to the cooking vessel A whereby the supported cover C can guide drippings from the inner surface $C_1$ of the supported cover C into the retention chamber $A_1$ of the cooking vessel A while covering only a minor portion of the area defined by the open top of the retention chamber $A_1$. A first description of a suitable orientation positions the cover C relative to the cooking vessel A such that (i) the entire supported cover C is vertically higher than the open top of the retention chamber $A_1$ of the cooking vessel A, (ii) the inner surface $C_1$ of the cover C faces upward, (iii) the plane defined by the rim $C_2$ of the cover C defines an angle of greater than 30°, preferably greater than 45° and most preferably greater than 60°, relative to horizontal, and (iv) a lowermost portion of the rim $C_2$ on the inverted cover C is positioned over the retention chamber $A_1$ of the cooking vessel A.

A second description of a suitable orientation positions the cover C relative to the cooking vessel A such that (i) the entire supported cover C is vertically higher than the retention chamber $A_1$ of the cooking vessel A, (ii) the supported cover C is inverted, (iii) a plane defined by the rim $C_2$ of the supported cover C is inclined away from the cooking vessel A, and (iv) a lowermost portion of the rim $C_2$ on the inverted cover C is positioned over the retention chamber $A_1$ of the cooking vessel A.

One embodiment of a second support assembly 40 is depicted in FIGS. 1-6. This embodiment of the second support assembly 40 includes a pair of laterally Lat spaced and transversely Trans projecting members 41 (right member 41r and left member 41s) that are longitudinally Long spaced a distance below the upper end 20a of the body 20. The projecting members 41 are preferably laterally Lat spaced as far as the body 20 permits as the greater the lateral Lat spacing the greater the lateral stability provided a cover C supported upon the members 41.

A stop member 41z is preferably provided on the projecting members 41 proximate the distal end (unnumbered) of the members 41 for preventing a cover C resting upon and supported by the members 41 from sliding off the members 41. The members 41 preferably project a transverse Trans distance of about 1 to 3 inches from the front surface 20a of the body 20 and are longitudinally Long spaced a distance of about 1 to 4 inches below the upper end 20a of the body 20, with a ratio thereof between about 2:1 to 1:4. Such relative spacing should provide the desired orientation for typical covers C resting upon and supported by the members 41 and leaning against the upper end 20c of the body as depicted in FIG. 6.

Another embodiment of a second support assembly 40 is depicted in FIGS. 7 and 8. This embodiment of the second support assembly 40 includes a combination 42 of a catch 42a and offset member 42b. The catch 42a is configured and arranged to secure the handle D of a cover C while the offset member 42b, spaced a longitudinal Long distance below the catch 42a, is configured and arranged to contact the outer surface (unnumbered) of a cover C suspended from the catch 42a so as to position the cover C into the desired orientation.

One embodiment of a catch 42a suitable for use in connection with a cover C having a loop style handle D is depicted in FIG. 7. This embodiment of the catch 42a is a single laterally Lat centered hook projecting a transverse Trans distance from the front surface 20a of the body 20. Another embodiment of a catch 42a suitable for use in connection with a cover C having a knob style handle D is depicted in FIG. 8. This embodiment of the catch 42a is an upwardly projecting wedge with a single laterally Lat centered notch (not shown).

Use

The utensil 10 can be used to support a cover C of a cooking vessel A in such a manner that service of food (not shown) from the cooking vessel A is unobstructed by the supported cover C while drippings from an inner surface C1 of the supported cover C are guided into the cooking vessel A. The utensil 10 is used by (i) resting the cooking vessel A upon a horizontal surface H, (ii) resting the utensil 10 upon the horizontal surface H proximate the cooking vessel A with the longitudinal Long axis of the body 20 extending vertically upward from the horizontal surface H, (iii) removing the cover C from the cooking vessel A, and (iv) supporting the removed cover C with the second support assembly 40 on the utensil 10 such that (–) the entire removed and supported cover C is vertically higher than the retention chamber A1 of the cooking vessel A, (–) the cover C is inverted, (–) a plane defined by the rim C2 of the removed and supported cover C is inclined away from the cooking vessel A, and (–) a lowermost portion of the rim C2 on the inverted cover C is positioned over the retention chamber A1 of the cooking vessel A.

When the first support assembly 30 includes a pair of pivotable legs 31, the utensil 10 can be conveniently used by (i) resting the utensil 10 upon a horizontal surface H with the legs 31 pivoted into the use position and resting upon the horizontal surface H and the longitudinal Long axis of the body 20 extending vertically upward from the horizontal surface H, (ii) resting the cooking vessel A upon the legs 31 of the resting kitchen utensil A, (iii) removing the cover C from the cooking vessel A, and (iv) supporting the removed cover C with the second support assembly 40 on the utensil 10 such that (–) the entire removed and supported cover C is vertically higher than the retention chamber A1 of the cooking vessel A, (–) the cover C is inverted, (–) a plane defined by the rim C2 of the removed and supported cover C is inclined away from the cooking vessel A, and (–) a lowermost portion of the rim C2 on the inverted cover C is positioned over the retention chamber A1 of the cooking vessel A.

Additional benefits achieved by resting the cooking vessel A upon the legs 31 of the resting kitchen utensil A are increased stability of the utensil 10 and preventing direct contact between a hot cooking vessel A and the horizontal surface H.

What is claimed is:

1. An aftermarket kitchen rack in combination with a cooking vessel having a retention chamber and a cover that includes an inner surface and a rim, the kitchen rack comprising:
    (a) a body having longitudinally spaced first and second ends and laterally spaced first and second sides within a common plane, and a transverse thickness,
    (b) a first support assembly attached to the body proximate the first end of the body, comprising a pair of laterally spaced apart legs with a first leg pivotally attached directly to the first side of the body and a second leg pivotally attached directly to the second side of the body for pivoting from a storage position in which each leg is laterally aligned with and abuts the corresponding side of the body to which the respective leg is attached, and a use position in which the legs extend transversely from the body such that when the legs are pivoted into the use position and supported upon a horizontal surface the body projects vertically upward from the horizontal surface, and (c) a second support assembly attached to the body proximate the second end of the body, wherein the second support comprises a pair of hooks that extend generally perpendicular from the body, wherein the hooks are laterally spaced apart from each other and each comprise a transverse member and a vertical stop portion at the distal end of each hook, the cooking vessel further comprising:
  (i) an open top cooking vessel retaining heated food in the retention chamber, the cooking vessel resting on top of the pair of laterally spaced apart legs of the first support assembly, and
  (ii) a cover configured and arranged to cover the open top of the cooking vessel, the cover resting on top of the laterally spaced hooks of the second support assembly at a tilted angle in a position higher than the open top of the retention chamber of the cooking vessel so that the cover extends over a portion of an area defined by the open top of the retention chamber whereby drippings from the inner surface of the elevated cover will fall into the retention chamber of the cooking vessel.

2. The kitchen rack according to claim 1, wherein the body has a longitudinal length of 8 to 16 inched, a lateral width of 2 to 6 inches, and a transverse thickness of 0.1 to 2 inches.

3. The kitchen rack according to claim 1, wherein the legs are each between 8 and 16 inches long.

4. The kitchen rack according to claim 1, wherein the transverse members of the hooks are longitudinally spaced at least 1 inch from the second end of the body.

5. The kitchen rack according to claim 1, wherein the transverse members of the hooks are laterally spaced between 2 to 6 inches apart.

\* \* \* \* \*